United States Patent
Hughes et al.

(10) Patent No.: US 9,856,157 B2
(45) Date of Patent: Jan. 2, 2018

(54) DEVICES, SYSTEMS AND METHODS FOR TREATMENT OF WATER WITH ELECTROMAGNETIC FIELDS

(71) Applicant: Reverse Ionizer Systems, LLC, Bethesda, MD (US)

(72) Inventors: Patrick J. Hughes, Vienna, VA (US); Desmond A. Fraser, Herndon, VA (US); Hossein Nik Ghaffari, Burke, VA (US); Robert A. Sutherland, Scottsville, VA (US)

( * ) Notice: Subject to any disclaimer, the term of this patent is extended or adjusted under 35 U.S.C. 154(b) by 926 days.

(21) Appl. No.: 14/170,546

(22) Filed: Jan. 31, 2014

(65) Prior Publication Data
US 2014/0216936 A1    Aug. 7, 2014

Related U.S. Application Data

(60) Provisional application No. 61/759,345, filed on Jan. 31, 2013.

(51) Int. Cl.
*C02F 1/48* (2006.01)

(52) U.S. Cl.
CPC ............ *C02F 1/48* (2013.01); *C02F 2303/22* (2013.01)

(58) Field of Classification Search
CPC ........................................................ C02F 1/48
See application file for complete search history.

(56) References Cited

U.S. PATENT DOCUMENTS

| | | | |
|---|---|---|---|
| 5,152,341 A | 10/1992 | Kasevich | |
| 5,326,446 A * | 7/1994 | Binger | C02F 1/487 204/663 |
| 5,514,283 A * | 5/1996 | Stefanini | B01J 19/12 210/143 |
| 5,568,121 A | 10/1996 | Lamensdorf | |
| 5,606,723 A * | 2/1997 | Morse | B01J 19/087 422/186 |
| 5,738,766 A * | 4/1998 | Jefferson | C02F 1/487 204/155 |
| 6,063,267 A | 5/2000 | Crewson et al. | |
| 6,375,829 B1 | 4/2002 | Shevchenko et al. | |
| 6,641,739 B2 | 11/2003 | Dresty et al. | |

(Continued)

FOREIGN PATENT DOCUMENTS

| | | |
|---|---|---|
| WO | WO2007133634 | 11/2007 |
| WO | WO 20080344335 | 5/2008 |
| WO | WO2011080679 | 7/2011 |

OTHER PUBLICATIONS http://www.dolphinwatercare.com/how-the-dolphin-system-works, Dolphin Watercare web site, "How it works: The Technology of Sustainable Water Treatment".

(Continued)

*Primary Examiner* — Bryan D. Ripa
(74) *Attorney, Agent, or Firm* — Capitol Patent & Trademark Law Firm, PLLC; John Curtin

(57) ABSTRACT

Electromagnetic water treatment devices for applying electromagnetic fields to liquids, such as water are disclosed. The water treatment devices may include a water-immersible probe configured to generate electromagnetic output fields effective to remove scale, prevent the growth of scale and/or eliminate microbes in a water supply system. Systems and methods for treating water using the disclosed devices are also provided.

21 Claims, 9 Drawing Sheets

(56) References Cited

U.S. PATENT DOCUMENTS

| | | |
|---|---|---|
| 7,244,360 B2 | 7/2007 | Cho |
| 7,419,603 B2 | 9/2008 | Cho |
| 2001/0035342 A1* | 11/2001 | Morse .................... B01J 19/087 |
| | | 204/164 |
| 2003/0160000 A1* | 8/2003 | Holland ................. B01D 17/04 |
| | | 210/695 |
| 2004/0238453 A1* | 12/2004 | Cho ...................... C02F 1/4602 |
| | | 210/702 |
| 2005/0199484 A1 | 9/2005 | Olstowski |
| 2008/0264800 A1* | 10/2008 | Schlager ................ C02F 1/008 |
| | | 205/743 |
| 2011/0284231 A1 | 11/2011 | Becker |
| 2012/0067727 A1* | 3/2012 | Thompson ............. B08B 17/00 |
| | | 204/661 |
| 2012/0217815 A1* | 8/2012 | Clark .................... C02F 1/487 |
| | | 307/104 |
| 2013/0277045 A1 | 10/2013 | Parsche |
| 2014/0216936 A1 | 8/2014 | Hughes |
| 2014/0326681 A1 | 11/2014 | Denvir et al. |
| 2014/0374236 A1 | 12/2014 | Moore et al. |
| 2016/0016829 A1 | 1/2016 | Hughes et al. |

OTHER PUBLICATIONS

Cho et al., "Mitigation of Calcium Carbonate Fouling Using RF Electric Fields", Proc. of Intl. Conf. on Heat Exchange Fouling and Cleaning VIII, pp. 384-391, Jun. 2009, Austria.

\* cited by examiner

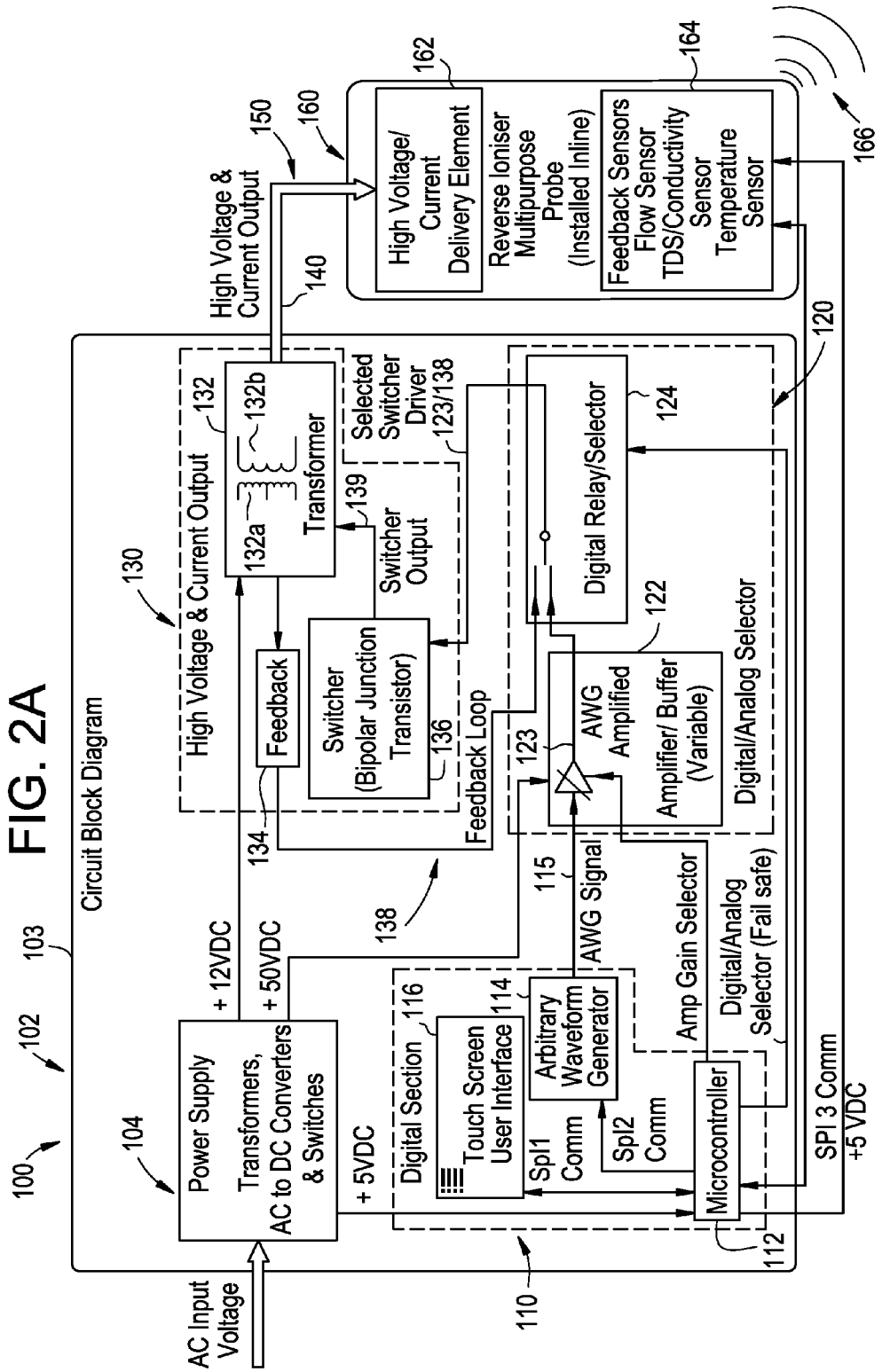
FIG. 2A Circuit Block Diagram

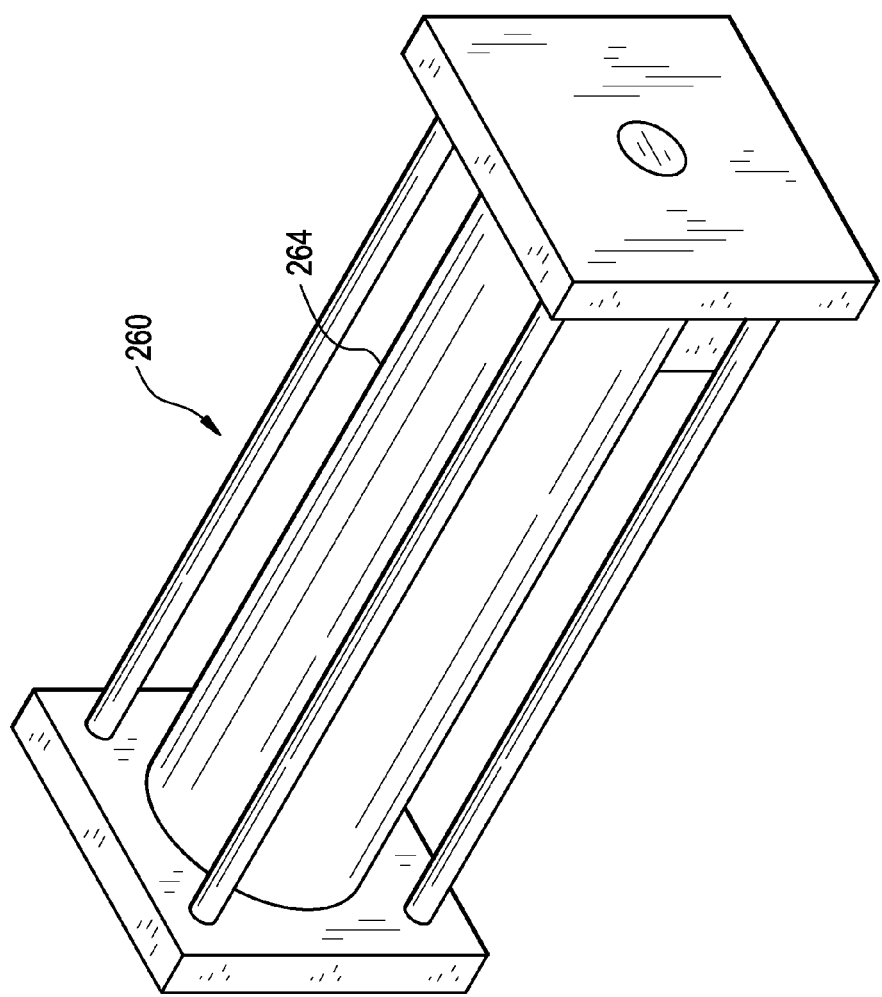

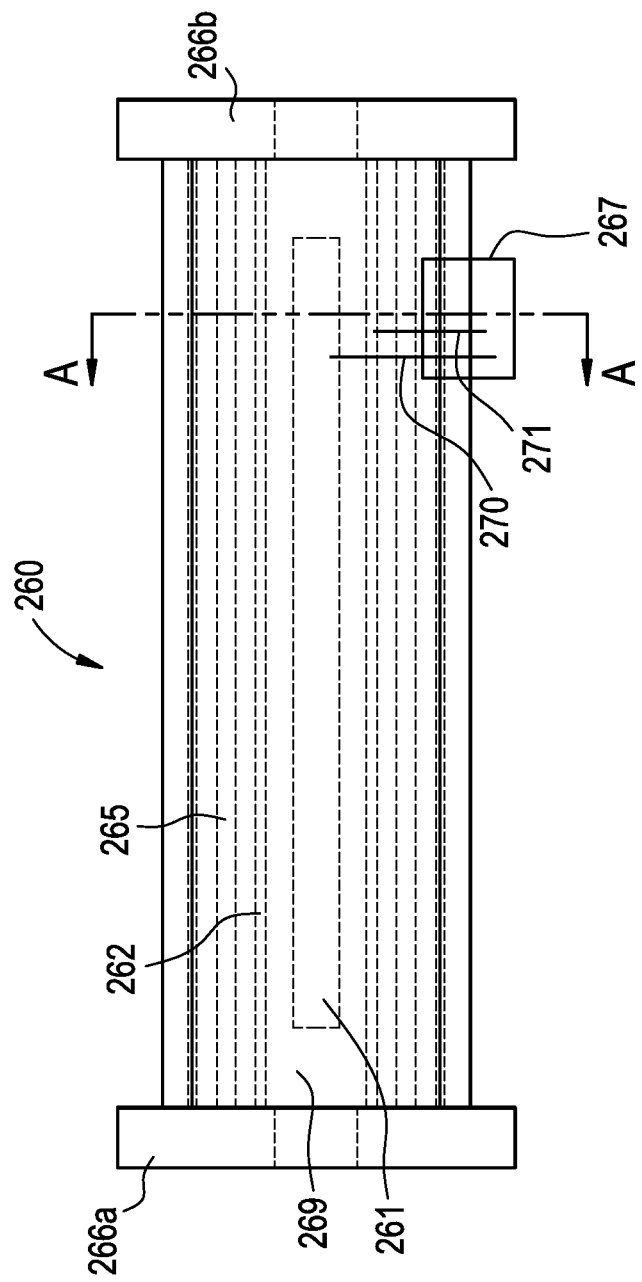

«DEVICES, SYSTEMS AND METHODS FOR TREATMENT OF WATER WITH ELECTROMAGNETIC FIELDS»

RELATED APPLICATION

This application is related to, and claims the benefit of priority from, U.S. Provisional Patent Application No. 61/759,345 filed Jan. 31, 2013 ("'345 Application"). The present application incorporates by reference herein the entire disclosure of the '345 Application, including its text and drawings, as if set forth in its entirety herein.

INTRODUCTION

Devices and methods that use electromagnetic fields and energy to purify or alter the characteristics of water are well known. For example, U.S. Pat. No. 5,326,446, issued to Binger on Jul. 5, 1994, discloses methods and devices for purifying water of mineral impurities and biological contaminants (e.g., bacteria, protozoa, algae and fungi). The devices and methods of the Binger patent employ a static electromagnetic field capable of treating ionic (mineral) impurities, a low frequency varying electromagnetic field for handling biological contaminants and a radio frequency varying electromagnetic field for handling biological contaminants and breaking up scale formations. The electromagnetic fields of the Binger devices and methods are applied in conjunction with a high output of negative ions into the water. It is believed that this combination of electromagnetic fields and ionic generation is capable of attacking a broad spectrum of impurities and contaminants commonly found in water.

It is desired to provide devices, systems and methods for treating water that improve upon conventional devices, systems and methods. More specifically, it is desirable to provide devices and methods for treating water that provide greater control over the application of electromagnetic energy to water, a greater range and variability of the voltage, current, frequency and waveform shape of electromagnetic energy applied to water, and high operational reliability and safety.

SUMMARY

Devices, systems and methods for treating water are provided. The devices, systems and methods disclosed herein are particularly applicable to treating water in a closed-loop water supply system.

According to an embodiment, a water treatment device for electromagnetically treating water includes a main unit having a digital control section and an analog signal generator. The digital control section can include an input device, a control device (e.g., microcontroller) and a digital waveform generator. The input device can be operable to receive input information including desired electrical characteristics of an electromagnetic output field. The control device can be configured to operate the waveform generator to generate a digital driver signal based on the input information. The analog signal generator can be configured to generate an analog driver signal. The main unit can include an output amplifier selectively drivable by one of the digital driver signal and the analog driver signal to generate an output signal having characteristics determined by characteristics of the digital driver signal or the analog driver signal. The main unit can also include a power supply configured to power the control device, the digital amplifier and the output amplifier. The water treatment device can further include a water-immersible, capacitive device, referred to commonly as a probe, configured to receive the output signal and generate the electromagnetic output field based on the output signal, wherein the electromagnetic output field has a frequency, voltage, current and signal waveform shape effective to remove scale or prevent the growth of scale in a water supply system.

In one embodiment, the capacitive device for removing, or preventing the growth of, scale may comprise: a capacitive device for removing, or preventing the growth of, scale comprising: a positive conductive element, a negative conductive element separated from the positive conductive element by an adjustable distance, wherein a size of the positive conductive element is 0.75 to 0.90 the size of the negative conductive element; means for applying an electrical output signal (e.g., power unit) having a first polarity to the positive conductive element and an electrical output signal having a second, opposite polarity to the negative conductive element to create an electromagnetic field between the elements to remove, or prevent, the growth of scale within a liquid in the electromagnetic field. The device may further comprise means for moving (e.g., control system) the positive or negative conductive elements to adjust the adjustable distance in order to change a resonant frequency of the created electromagnetic field to maximize the removal, or prevention of growth, of scale within the electromagnetic field.

The first and second conductive elements may comprise respective plates (referred to as "first" and "second" plates), or alternatively, may comprise first and second respective cylindrical structures (referred to as "first" and "second" cylindrical structures). When the elements comprise plates, the size difference between plates is related to surface area. In one embodiment, a surface area of the first plate may be 0.75 to 0.90 the surface area of the second plate. Alternatively, when the elements comprise cylindrical structures, the size difference refers to lengths. In one embodiment, a length of the first cylindrical structure may be 0.75 to 0.90 the length of the second cylindrical structure.

According to a further embodiment, the main unit can include a digital/analog selector operable by the control device to enable selective driving of the output amplifier with one of the analog driver signal and the digital driver signal.

According to a further embodiment, the main unit can include a digital/analog selector operable to drive the output amplifier with the analog driver signal upon failure of the digital control section.

According to a further embodiment, the control device can be configured to adaptively alter the digital driver signal based on input measurements of at least one of a total dissolved solids level/conductivity of the water, a flow rate of the water, a temperature of the water and a pH of the water.

According to a further embodiment, the probe can include at least one of a total dissolved solids/conductivity sensor, a flow rate sensor, a temperature sensor and a pH sensor.

According to yet a further embodiment, the probe can include at least one of a total dissolved solids/conductivity sensor, a flow rate sensor, a temperature sensor and a pH sensor configured to provide water condition information to the control device, and the control device can be configured to adaptively alter the digital input signal based on the water condition information.

According to another embodiment, a water supply system can include a closed-loop water supply containing circulating water, and a water treatment device. The water treatment device can include a digital control section and an analog signal generator. The digital control section can include an input device (e.g., microcontroller) and a digital waveform generator. The input device can be operable to receive input information including desired electrical characteristics of an electromagnetic output field. The control device can be configured to operate the waveform generator to generate a digital driver signal based on the input information. The analog signal generator can be configured to generate an analog driver signal. The main unit can include an output amplifier selectively drivable by one of the digital driver signal and the analog driver signal to generate an output signal having characteristics determined by characteristics of the digital driver signal or the analog driver signal. The main unit can also include a power supply configured to power the control device, the digital amplifier and the output amplifier. The water treatment device can further include a probe inserted in the water. The probe can be configured to receive the output signal and apply the electromagnetic output field based on the output signal to the circulating water, wherein the electromagnetic output field has a frequency, voltage, current and shape effective to remove scale or prevent the growth of scale in the water supply.

According to an embodiment, a method for removing scale or preventing growth of scale in a water supply system includes providing a device including a main unit and a probe. The main unit can include a digital control section and an analog signal generator. The digital control section can include an input device, a control device (e.g., microcontroller) and a digital waveform generator. The input device can be operable to receive input information including desired electrical characteristics of an electromagnetic output field. The control device can be configured to operate the waveform generator to generate a digital driver signal based on the input information. The analog signal generator can be adapted to generate an analog driver signal. The main unit can include an output amplifier selectively drivable by one of the digital driver signal and the analog driver signal to generate an output signal having characteristics determined by characteristics of the digital driver signal or the analog driver signal. The main unit can also include a power supply configured to power the control device, the digital amplifier and the output amplifier. The probe can be configured to receive the output signal and generate the electromagnetic output field based on the output signal. The method further includes inserting the probe into the water and operating the main unit to generate the electromagnetic output field.

According to a further embodiment, the method can include altering the digital driver signal based on input measurements of at least one of a total dissolved solids level/conductivity of the water, a flow rate of the water, a temperature of the water and a pH of the water.

According to a further embodiment, the method can include driving the output amplifier with the analog driver signal upon failure of the digital control section.

According to another embodiment, a method for removing scale or preventing growth of scale in a water supply system includes providing a device comprising a main unit configured to generate an electrical output signal, and a probe configured to receive the electrical output signal and generate an electromagnetic output field based on the electrical output signal. The method includes inserting the probe into the water, operating the main unit to generate the electrical output signal, and adaptively altering the electrical output signal based on input measurements of at least one of a total dissolved solids level/conductivity of the water, a flow rate of the water, a temperature of the water and a pH of the water.

According to additional embodiments, the devices, systems and related methods disclosed herein can be adapted to eliminate or reduce microbial contaminants in water.

Additional related methods, features and advantages of the invention will become clear to those skilled in the art from the following detailed description and appended drawings.

BRIEF DESCRIPTION OF THE DRAWINGS

FIG. 2a is a schematic representation of the electrical water treatment device shown in FIG. 1, according to an embodiment.

FIG. 2e depicts one view of an alternative capacitive device that utilizes cylindrical structures as conductive elements according to an embodiment of the invention.

FIG. 2f depicts a second view of the capacitive device shown in FIG. 2e.

DETAILED DESCRIPTION

Figure 1:
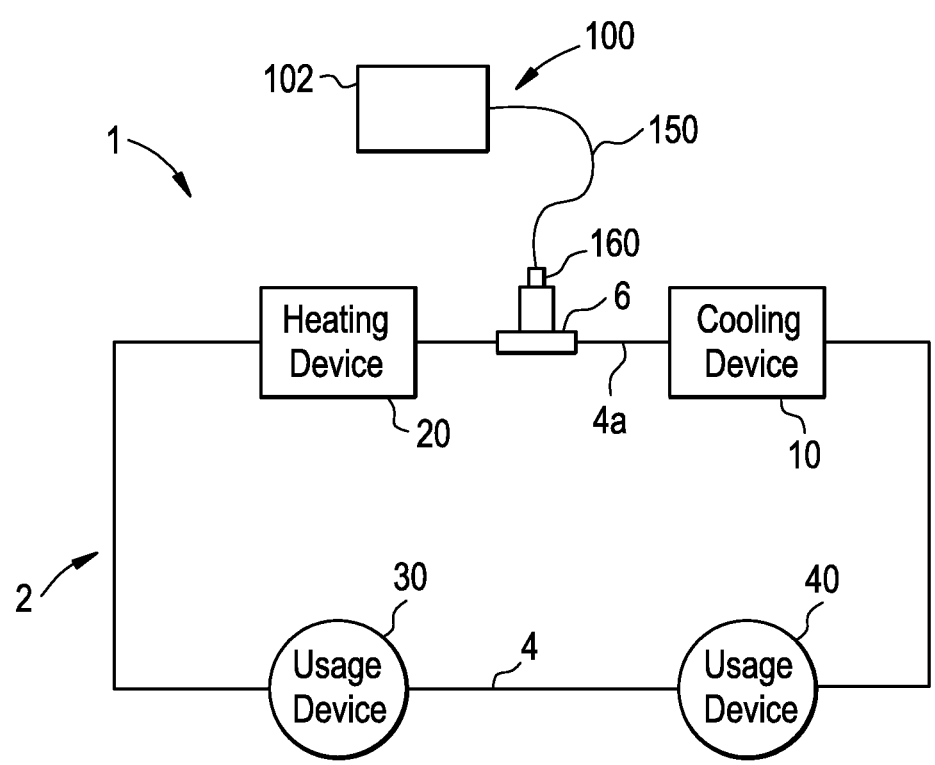
FIG. 1 is a schematic drawing showing an exemplary closed-loop water supply system including an electrical water treatment device, according to an embodiment.

FIG. 1 shows an exemplary water supply system 1, according to an embodiment. The water supply system 1 includes a closed-loop water supply 2 having pipe system 4, a cooling device (e.g., chiller) 10, a heating device (e.g., boiler or water heater) 20 and water usage devices 30, 40. The pipe system 4 supplies water to and interconnects the cooling device 10, the heating device 20 and the usage devices 30, 40. Each of the usage devices 30, 40 can be any type of device or appliance (e.g., sink, faucet, toilet, dishwasher, refrigerator, etc.) that uses water from the pipe system 4. It should be understood that the system 1 is merely one example of a water supply system and, although the system 1 is shown as having a single cooling device 10, a single heating device 20 and two usage devices 30, 40, many different numbers, types and combinations of devices 10, 20, 30 and 40 are possible.

Still referencing FIG. 1, the water supply system 1 includes an electrical water treatment device 100 having a main unit or power unit 102 and a probe 160 connected to the main unit 102 by an electrically conductive cable 150. The probe 160 can be an elongate (e.g., rod-shaped) member and can be inserted in-line with a pipe 4a or other component of the pipe system 4 by a fixture 6, such as a T-shaped joint. It should be understood that it is possible to provide additional water treatment devices 100. For example, larger water supply systems, or systems with multiple pipe locations that are likely to promote the growth of scale, may benefit from having multiple water treatment devices 100.

Generally stated, and as described later in more detail, the water treatment device 100 can apply one or more electromagnetic output fields to the water in the water supply 2 via the probe 160. With the proper application of electromagnetic field(s), the water treatment device 100 can effectively remove scale and/or prevent the growth of scale in the water supply 2. Additionally, the water treatment device 100 can be operated to eliminate microbial contaminants from the water in the water supply 2. As will be described later in more detail, the device 100 can generate a wide variety of electromagnetic output fields depending upon the particular application and the water conditions that exist in the application. Adjustments can be made to the device 100 to utilize a static electromagnetic output field, a high, low or medium frequency electromagnetic output field, a combination of multiple high frequency, low frequency, and/or medium frequency electromagnetic fields, and electromagnetic output fields that have various wave shapes (e.g., sine, triangular, square, sawtooth or pulse). Additionally, the electromagnetic fields generated by the device 100 can be adaptively varied in frequency, voltage, current and/or waveform shape based on water conditions in the water supply 2.

FIG. 2a shows an exemplary embodiment of the water treatment device 100. As shown in FIG. 2a, the main unit 102 includes power supply 104, a digital control section 110, a digital/analog selector section 120 and an output section 130. The power supply 104 can be connected to an AC input voltage and supplies power to the digital control section 110, the digital/analog selector section 120 and the output section 130. The power supply 104, the digital control section 110, the digital/analog selector section 120 and the output section 130 can be mounted or contained in a housing or casing 103.

Still referencing FIG. 2a, the digital control section 110 includes a control device or microcontroller 112 connected to the power supply 104, a waveform generator 114 and a user input device or touch screen user interface 116. The waveform generator 114 is controlled by the microcontroller 112 and can be an integrated circuit configured to generate digital input signals 115 of various waveforms (e.g., sine, triangular, square, sawtooth and pulse waveforms) that are input to the digital/analog selector section 120. The microcontroller 112 interfaces with the user interface 116, which can accept user inputs indicating desired characteristics of the electromagnetic output field(s) 166 output by the device 100. The microcontroller 112 can operate the waveform generator 114 based on information input to the user interface 116. The characteristics (e.g., voltage, current, frequency and waveform shape) of the digital input signals 115 vary based on the user inputs indicating the desired characteristics of the electromagnetic output field 166. Additionally, the user interface 116 can display waveform settings and feedback information from connected sensors 164 (described later in more detail).

As shown in FIG. 2a, the digital/analog selector section 120 includes an amplifier/buffer 122 and a digital relay/selector 124. The amplifier/buffer 122 is connected to the microcontroller 112 and the waveform generator 114. The digital relay/selector 124 is connected to the microcontroller 112 and is connected at its input side to the output of the amplifier/buffer 122. The amplifier/buffer 122 is powered by the power supply 104, and is operable to receive the digital input signals 115 from the waveform generator 114 and amplify the digital input signals 115 to generate digital driver signals 123. The gain of the amplifier/buffer 122, and therefore the amplitude of the digital driver signals 123 is controlled by the microcontroller 112 based on the desired characteristics of the electromagnetic output field 166. The amplifier/buffer 122 is selectively connectable to an input side of the digital relay/selector 124 such that the digital driver signals 123 can be forwarded from the amplifier/buffer 122 to the digital relay/selector 124.

Continuing with reference to FIG. 2a, the output section 130 includes an output amplifier or output transformer 132 powered by the power supply 104, a feedback filter device 134 configured to receive feedback signals 133 from a primary winding 132a of the output transformer 132 and selectively connectable to the input side of the digital relay/selector 124, and a switcher (e.g., bipolar junction transistor) 136 connected to an output side of the digital relay/selector 124 and the input side of the transformer 132.

The microcontroller 112 is programmed such that, in a default, digital, operational mode of the device 100, the amplifier/buffer 122 is connected to the input side of the digital relay/selector 124 and the feedback filter device 134 is disconnected from the input side of the digital relay/selector 124. Thus, the microcontroller 112 and waveform generator 114 operate to digitally drive the output transformer 132 with the digital driver signals 123. In comparison to analog driver signals, the digital driver signals 123 provide much greater control over the characteristics of the electromagnetic output field 166 generated by the device 100. More specifically, driving the output transformer 132 with the digital driver signals 123 provides greater options with respect to controlling the frequency, voltage, current and waveform shape of the electromagnetic output signals 166.

Continuing, in the digital operational mode, the digital driver signals 123 are sent to the switcher 136 through the digital relay/selector 124. The switcher 136 modifies the digital driver signals 123 to generate switcher signals 139 and then supplies the switcher signals 139 to the input side of the output transformer 132. The secondary winding 132b of the output transformer 132 then generates output signals 140 based on the digital driver signals 123 and delivers the output signals 140 to the probe 160 through the cable 150.

Referring still to FIG. 2a, in a backup (analog) or failsafe operational mode, the amplifier/buffer 122 is disconnected from the input side of the digital relay/selector 124 and the feedback filter device 134 is connected to the input side of the digital relay/selector 124. The backup or failsafe operational mode can be automatically selected by the microcontroller 112 upon the microcontroller 112 detecting failure of the digital control section 110, or the backup or failsafe operational mode can be manually selected by a user through the user interface 116.

In the backup or failsafe mode, the primary winding 132a of the output transformer 132 and the feedback filter device 134 operate to drive the secondary winding 132b of the output transformer 132 with analog driver signals 138. More specifically, the feedback filter device 134 filters/modifies the feedback signals 133 to generate the analog driver signals 138. The analog driver signals 138 are fed to the switcher 136 via the digital relay/selector 124, the switcher 136 modifies the analog driver signals 138 to generate switcher signals 139, and the switcher signals 139 are supplied to the input side of the output transformer 132. Thus, a feedback loop is formed by the output transformer 132, the feedback filter device 134, the digital relay/selector 124 and the switcher 136, and these components function as a feedback oscillator to operate the device 100 in an analog mode. The secondary winding 132b of the output transformer 132 generates output signals 140 based on the analog driver signals 138 and delivers the output signals 140 to the probe 160 through the cable 150. When the device 100 is operated in this analog mode, the possible ranges of frequency, voltage, current and waveform shapes are limited in comparison to the digital mode. In the analog mode, the electromagnetic output fields 166 can be controlled by analog controls (not shown) or, alternatively, by user inputs fed to the microcontroller 112 through the user interface 116.

Still referencing FIG. 2a, the probe 160 can be a water-immersible, elongate member including a high voltage/high current delivery element 162. The delivery element 162 can be constructed of any electrically conductive material, however, it is preferable that the deliver element 162 be constructed of a corrosion-resistant material such as stainless steel, aluminum or graphite, for example. The delivery element 162 is configured to receive the output signals 140 and generate the output electromagnetic fields 166 based on the output signals 140. The electromagnetic fields 166 can be suitable for removing scale formations in the water supply 2 (FIG. 1), preventing the growth of scale in the water supply 2 and/or eliminating/reducing microbial contamination in the water supply 2.

The probe 160 can optionally include one or more feedback sensors 164 that are powered by the microcontroller 112. The feedback sensors 164 can be connected to the microcontroller 112 such that they can be calibrated by the microcontroller 112 and provide the microcontroller 112 feedback information related to water conditions. By way of example, the feedback sensors 164 can include one or more of a total dissolved solids (TDS)/conductivity sensor, a flow rate sensor, a temperature sensor and a pH sensor configured to provide the microcontroller 112 feedback information regarding a total dissolved solids level/conductivity of the water, a flow rate of the water, a temperature of the water and a pH of the water, respectively. Thus, based on the feedback information from the sensors 164, the characteristics (e.g., voltage, frequency, current and/or waveform shape) of the output electromagnetic output fields 166 can be varied adaptively (automatically by the microcontroller 112 based on pre-programmed settings) or manually by a user in order to optimize scale removal/growth prevention and/or microbe elimination in the water supply 2 (FIG. 1).

In embodiments in which the probe 160 does not include sensors 164, the sensors can be provided separately in the water supply 2 and used in a similar manner to maintain optimal electromagnetic output field settings of the device 100.

Figure 2B:
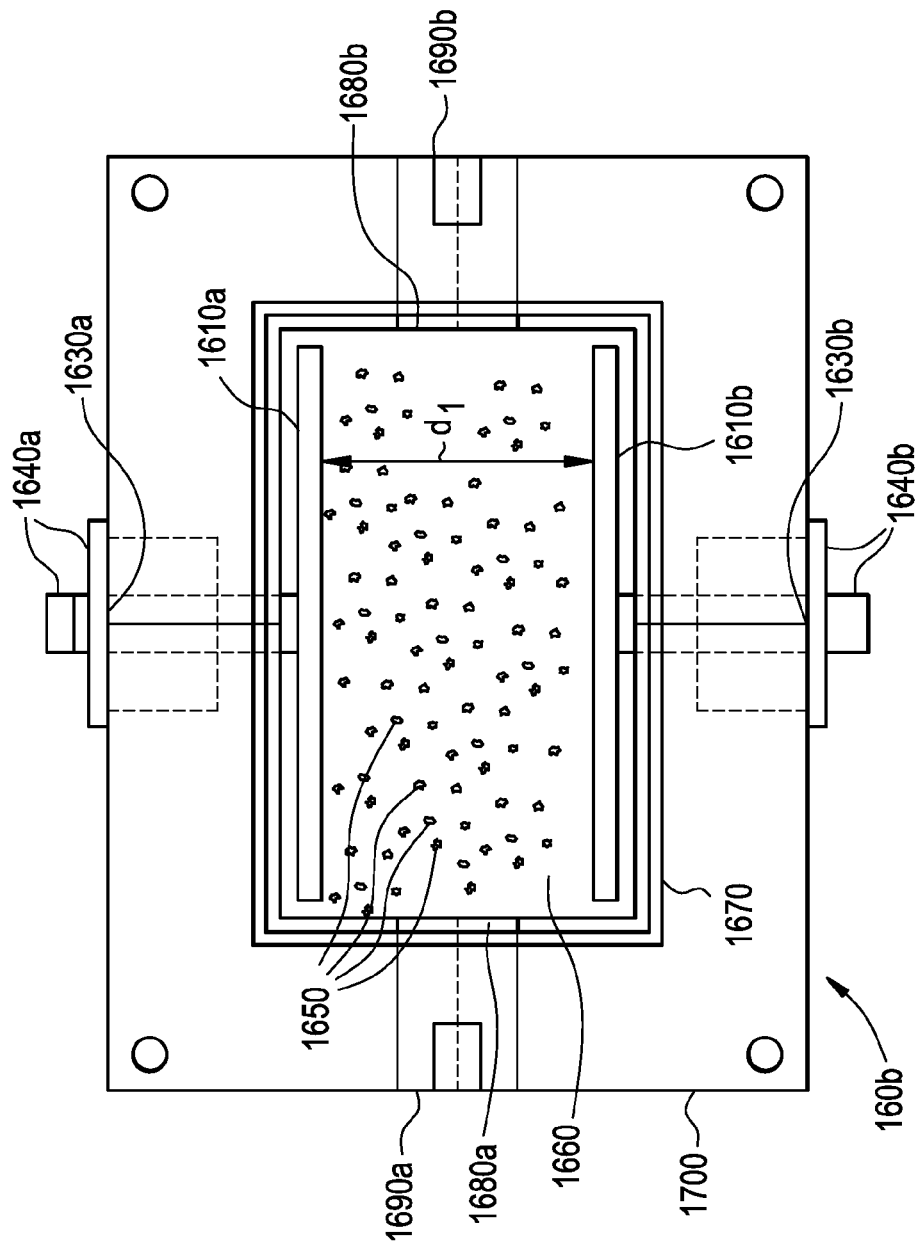
FIG. 2b depicts one view of a capacitive device that utilizes plates as conductive elements according to one embodiment of the invention.
Figure 2C:
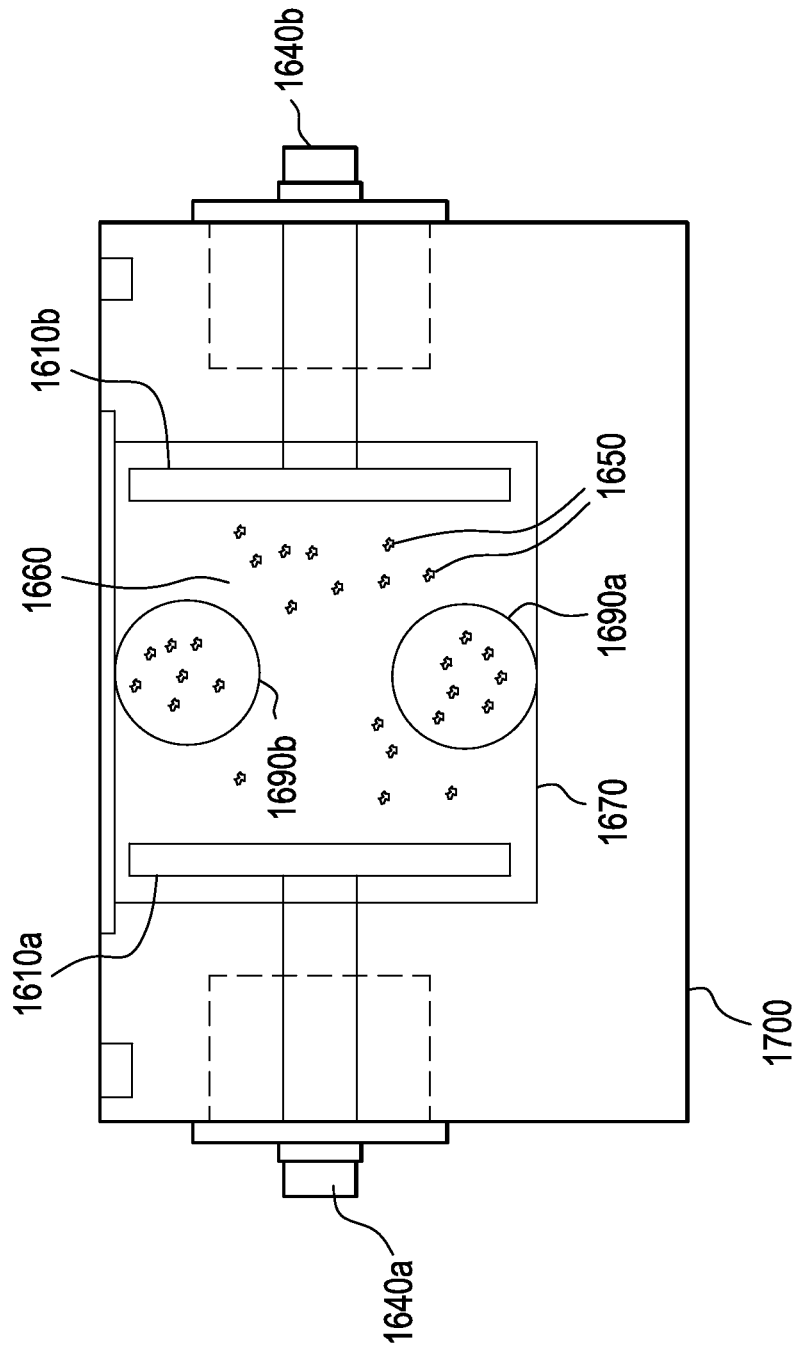
FIG. 2c depicts a second view of the capacitive device shown in FIG. 2b.
Figure 2D:
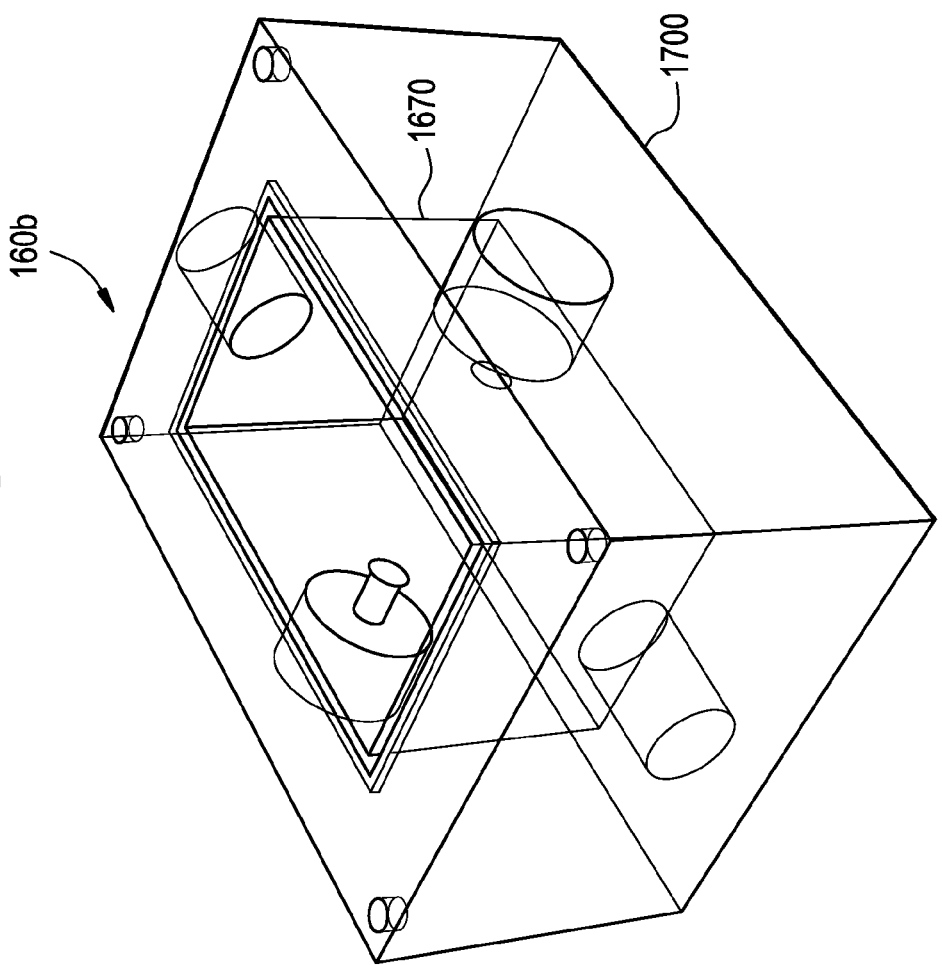
FIG. 2d depicts a third view of the capacitive device shown in FIG. 2b.

Referring now to FIGS. 2b through 2d there is depicted views of a capacitive device 160b according to another embodiment of the invention. As shown, the device 160b may comprise: a positive conductive element 1610a; a negative conductive element 1610b separated from the first conductive element 1610a by an adjustable distance, $d_1$; means 1630a, 1630b, such as a power unit and electrical wires, for supplying and/or applying an electrical output signal having a first polarity to the positive conductive element 1610a and an electrical out signal having a second, opposite polarity to the negative conductive element 1610b to create an electromagnetic field between the first and second elements 1610a, 1610b to remove, or prevent, the growth of scale within a liquid in the electromagnetic field. The device may further include means 1640a, 1640b for moving the positive and negative conductive elements 1610a, 1610b to adjust the adjustable distance $d_1$, (such as a control system that includes a servo-motor or another controllable motor along with a motor controller), in order to change a resonant frequency of the created electrical field to maximize the removal of scale 1650 from a liquid 1660, such as mineralized water, within the electromagnetic field. It should be understood that the scale 1650 depicted in the figures is not shown to scale. That is, it has been enlarged for illustrative purposes. In many cases the scale is microscopic and cannot be seen by the naked eye. In the embodiment depicted in FIGS. 2b through 2d the elements 1610a, 1610b may comprise plates, and may be enclosed by a treatment chamber 1670. The chamber 1670 may be operable to surround the elements 1610a, 1610b, and comprise first and second openings 1680a, 1680b connected to input and output supply lines 1690a, 1690b (e.g., pipes) that operate to supply a liquid, such as mineralized water 1660 into the chamber 1670 (via line 1690a, for example) and operate to allow such a liquid to exit the chamber 1670 (via line 1690b, for example). In one embodiment the chamber 1670 may be a chamber having the dimensions of 3 inches in length, 3 inches in width and 5 inches in height while the openings 1680a, 1680b and associated lines 1690a, 1690b may have a diameter of ½ inch.

The probe 160b may comprise a support structure 1700 that provides support for, and encloses components 1610a through 1690b, for example. The support structure 1700 may be made from a Delrin material, for example.

As depicted the first and second elements 1610a, 1610b may comprise respective, substantially parallel plates. In an additional embodiment of the invention, the surface area of the respective plates 1610a, 1610b need not be the same in order to reduce the effects of fringing. Fringing refers to the portion of an electromagnetic field that is not located between the two elements but instead extends outside of the area between the elements, for example, that portion which surrounds the perimeter or edge of each element. Because this field is outside of the area between the two elements it is not usually involved in the removal or reduction of scale from water that flows between the two elements.

In accordance with one embodiment, to reduce the effects of fringing, or, said another way, to focus more of the electromagnetic field to the area between the two elements 1610a, 1610b different size elements are used. The different size elements affect the shape of the resulting electromagnetic field such that more of the field is located in the area between the two elements 1610a, 1610b than outside the area.

For example, the ratio of the surface area of the positive element 1610a to the surface area of the negative element 1610b may be in the range 0.75 to 0.90. That is to say the surface area of the positive element 1610a may be only 75% to 90% of the surface area of the negative element 1610b (i.e., the positive element is smaller than the negative element). In an embodiment of the invention, the different surface areas of the elements 1610a, 1610b reduces the effects of fringing.

Continuing, as depicted the elements 1610a, 1610b may be perpendicularly attached to the means 1640a, 1640b for moving the first or second conductive elements 1610a, 1610b. In one example means 1640a, 1640b may comprise a control system as described above, and, in addition, horizontally aligned rods attached to a suitable servo-motor or other motor, and a motor control system (e.g., programmable controller; not shown for clarity). The rods may be made from stainless steel, for example. In one example, the dimensions of each rod may be ½ inch in diameter, and 6 inches in length. In an embodiment, the rods may be compression fitted on each side of the chamber 1670.

Referring more specifically now to FIG. 2c, in one example, mineral water 1660 may transverse a path through the treatment chamber 1670. For example, water 1660 may be input into the chamber 1670 from supply line 1690a located at the bottom of the chamber 1670. Once within chamber 1670, the water 1660 may flow between elements 1610a, 1610b and then be output from supply line 1690b at the top of the chamber 1670. The configuration depicted in FIGS. 2b-d permits a sufficient amount of water to flow through the chamber 1670 in order to remove a sufficient amount of scale, such as calcium carbonate.

In one exemplary operation for removing scale from the water 1660, an electrical current having a first polarity may be applied by means 1630a to the first element 1610a and an electrical current having a second, opposite polarity may be applied by means 1630b to the second element 1610b. Means 1630a, 1630b may comprise a power unit and associated electrical wiring. Upon application of the electrical currents a resulting electromagnetic field is created within the chamber 1670. In an embodiment of the invention, the field lines of the electromagnetic field traverse the water 1660 within the chamber 1670 between the elements 1610a, 1610b. As described herein, the application of the electromagnetic field to the water 166 reduces the amount of scale 1650 in the water 1660.

Upon application of the electrical current the elements 1610a, 1610b function as a parallel plate capacitor whose capacitance is dependent the distance $d_1$ between the elements and the dielectric constant of the mineralized water or other liquid 1660 within chamber 1670.

In more detail, changing the effective distance $d_1$ between elements 1610a, 1610b changes the resonance frequency of the parallel plate capacitor formed by the elements 1610a, 1610b while the electrical currents are applied.

It should be understood that the distance $d_1$ may be selected based on a number of factors. For example, given the fact the distance $d_1$ between elements 1610a, 1610b traverses a volume of liquid flowing in the chamber 167, $d_1$ should be selected such that an intended or flow rate of a water supply system is met. That is to say, a given water supply system typically requires water (or another liquid) to flow at a particular rate. In accordance with an embodiment of the invention, when an inventive probe, such as probe 160b, is connected to such a water supply system the particular flow rate should be maintained.

In an embodiment of the invention, the amplitude of the electromagnetic signal created when the electrical output signals are applied to the plates 1610a, 1610b may be maximized by setting the frequency of the electrical output signals applied to the plates 1610a, 1610b at a resonant frequency. Accordingly, in an embodiment of the invention, when the electrical output signals applied to the plates 1610a, 1610b are supplied by reverse ionization generator, the output inductance of the generator forms a parallel resonant circuit.

Figure 2G:
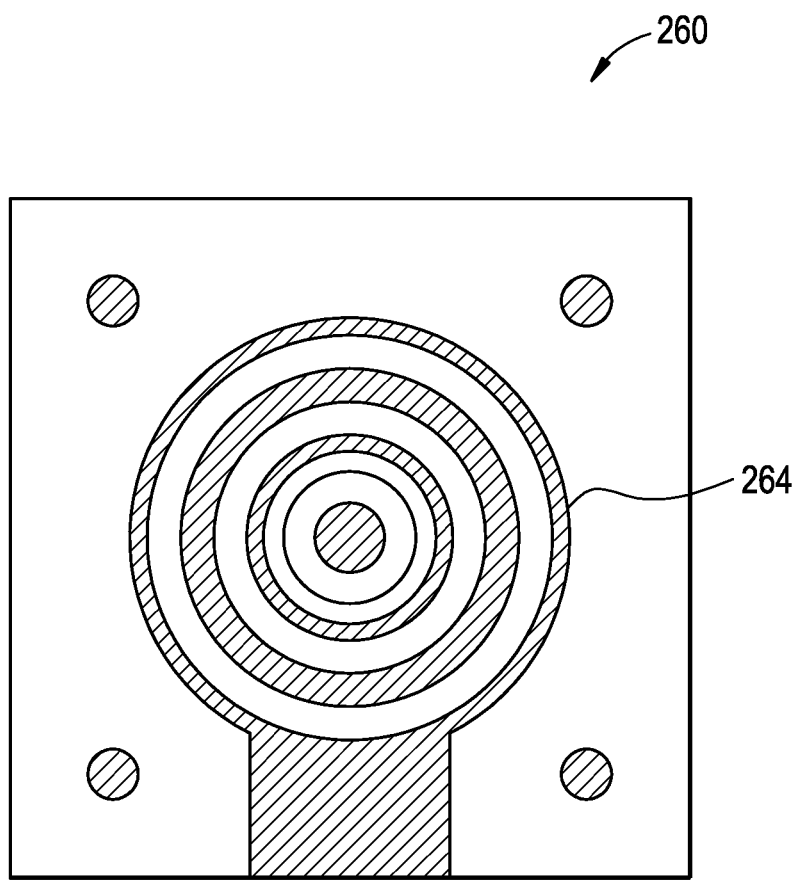
FIG. 2g depicts a third view of the capacitive device shown in FIG. 2e.

FIGS. 2e through 2g depict views of an alternative capacitive device 160b that utilizes cylindrical structures instead of plates according to an embodiment of the invention. Though FIGS. 2f and 2g include dimensional information, it should be understood that these are exemplary only, and, other dimensions may be substituted.

Referring to FIGS. 2e through 2g, probe 260 may comprise a cylindrical housing 264 made of 303-stainless steel material, for example. Shown inside the housing 264 is: a horizontally aligned non-conducting cylindrical tube 265 made of Delrin material, for example; a horizontally aligned stainless steel cylindrical tube 262 made of 303-stainless steel material, for example, hereafter referred to as the positive element; a horizontally aligned stainless steel cylindrical rod 261 made of 303-stainless steel material, for example, referred to hereafter as the negative element; two threaded end-caps 266a,b made of 303-stainless steel material, for example, for connecting the housing 264 to two pipes made of 0.750 inch stainless steel (not shown) for inputting and outputting a liquid, such as mineralized water into, and out of, the housing 264.

In exemplary embodiments the typical dimensions of the components described above are:

housing 264: 3.25 inches in diameter, 12 inches in length, having a wall or thickness of 0.125 inches;

horizontally aligned non-conducting cylindrical tube 265: 2.0 inches in diameter, 0.25 inch wall thickness and 12 inches in length;

horizontally aligned stainless steel cylindrical tube 262: 1.5 inches in diameter, 0.125 inch wall thickness, and 10 inches in length;

horizontally aligned stainless steel cylindrical rod 261: 0.5 inch in diameter, and 8 inches in length; and threaded end-caps 266: each 5.0 inches by 5.0 inches by 0.750 inches with threads for 0.750 inch thick stainless steel pipes.

Two compression fittings 270, 271 may be electrically connected to the positive and negative elements 261,262. The other ends of the compression fittings function as electrical terminals for connecting the probe 260b to a terminal block 267. The annulus spacing between the elements 261,262 forms a treatment chamber 269.

In an embodiment, the elements 261,262 form a cylindrical capacitor whose capacitance depends on the annulus spacing between the elements 261,262 and the dielectric constant of the mineralized water flowing in the probe 260. Changing the effective annulus spacing of the elements changes resonance frequency of the probe when electrically stimulated. When driven by a reverse ionization generator producing electromagnetic fields, the output inductance of the generator and the probe's 260 input impedance forms a parallel resonant circuit. In an exemplary embodiment, this annulus spacing may be 2 inches, for example.

In an embodiment of the invention, the amplitude of the electromagnetic signal created when electrical output signals are applied to elements 261,262 may be maximized by setting the frequency of the electrical output signals applied to the elements 261, 262 to a resonant frequency.

In accordance with one embodiment, to reduce the effects of fringing the two different size elements 261, 262 are used. The different size elements affect the shape of the resulting electromagnetic field such that more of the field is located in the area between the two elements 261, 262 than outside the area.

For example, the ratio of the length of the positive element 261 to the length of the negative element 262 is in the range 0.75 to 0.90, for example. That is to say the length of the positive element 261 is only 75% to 90% of the length of the negative element 262 (i.e., the positive element is shorter than the negative element). In an embodiment of the invention, the different lengths of the elements 261,262 reduces the effects of fringing.

Referring back to FIG. 2a, to use the device 100, the device 100 can be connected to an AC power source and a probe 160, 160b, 260 can be inserted in-line with a pipe (e.g., pipe 4a in FIG. 1) or other component of a water supply system using a fixture (e.g., fixture 6 in FIG. 1 or the structures described in FIGS. 2b through 2g) such that the probe 160, 160b, 260 is immersed in or directly contacts water from the pipe. It may be preferable to insert the probe 160 at or near a location that is susceptible to the formation of scale or the accumulation of microbes. Once the probe 160 is installed in the water supply system, desired characteristics of the electromagnetic output field(s) 166 can be input via the user interface 166 and the main unit 102 can be operated to generate the electromagnetic output field(s) 166 and apply the field(s) to the water such that existing scale in the water supply system is broken up, the formation of new scale is prevented and/or microbial agents are killed. The device 100 can be operated substantially continuously or intermittently as required to achieve desired water treatment goals. As indicated above, based on the feedback information from sensors 164 or similar sensors within the water supply system, the characteristics of the output electromagnetic output fields 166 can be varied adaptively (automatically by the microcontroller 112 based on pre-programmed settings) or manually by a user in order to optimize scale removal/growth prevention and/or microbe elimination.

In general, it is believed that electromagnetic fields in the radio frequency spectrum will prevent the buildup of scaling deposits directly on the probe 160. It is also believed that radio frequency electromagnetic fields break up scale that has accumulated within a water conduit or container, and will eventually remove such scale to again be silted out in a fine powder form.

It is further believed that radio frequency electromagnetic fields also contribute to sterilizing and decontaminating water containing microbial contaminants (e.g., bacteria, amoeba, protozoa, algae, fungus, etc.). It is believed that a fast rising spike (i.e., quickly rising high amplitude waves) in the electromagnetic signal (as opposed to merely the implementation of low amplitude radio frequency waves) is critical to biological contaminant purification. This low frequency spike appears to act as a shock to the bacteria, amoeba, protozoa, etc., within the water and breaks down their protective mechanisms.

It is believed that, when the device 100 is used primarily as a static high voltage generator, as in descaling applications, the preferred voltage output may be generally between 2,000 and 5,000 volts. It is believed, however, that the device 100 can function with a static field as low as 1,000 volts and as high 10,000 volts.

When the power unit is used as a combination static high voltage generator and a high negative ion generator, it is believed that the preferred output voltage may be generally between 3,500 and 5,000 volts static field. When the power unit is used strictly as a negative ion generator, it is believed that the preferred output voltage may be 1,500 to 3,000 volts static field with a resultant negative ion output of approximately 100 to 2,000 volts.

When the device 100 is used to control bacteria, ameba, protozoa, algae, fungus, etc., pulse rate frequencies of the electromagnetic field(s) 166 can be set to coincide with generally accepted frequencies that control particular types of organisms. For example, the control frequency for *E. Coli* bacteria is generally known to be 802 cycles per second. The voltage output on such frequencies can preferably be between 2,000 and 5,000 volts.

Figure 3:
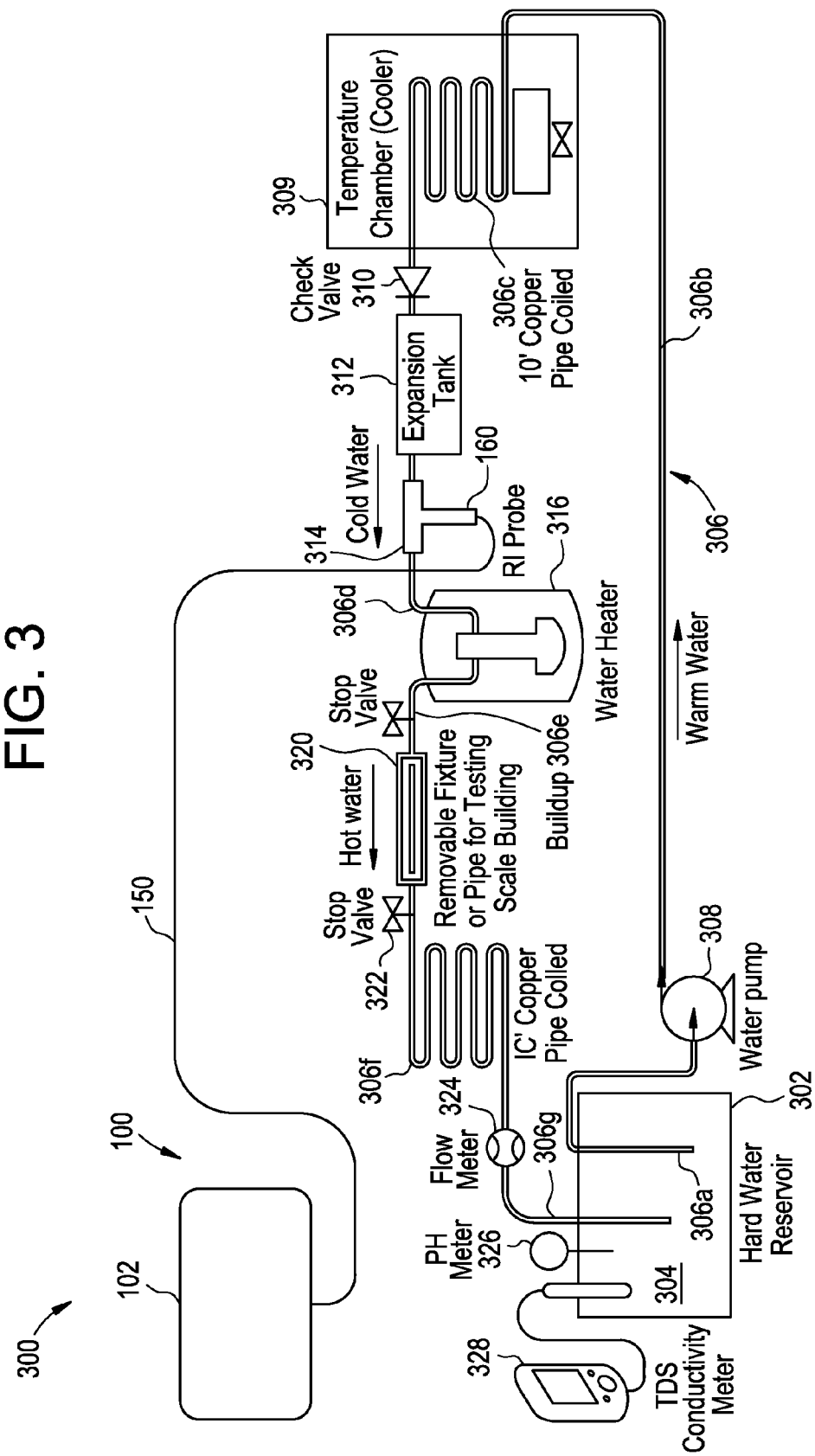
FIG. 3 is a schematic drawing of an exemplary experimental water supply system including the electrical water treatment device of FIGS. 1 and 2.

Experimental Setup—FIG. 3

Although the prior art provides some disclosure of suitable characteristics of electromagnetic fields for treating scale and microbes in water supply systems, the inventors understand that every water supply system is potentially different and may therefore require variations in device settings and treatment methods to optimize scale removal and scale growth prevention, and to optimize microbe elimination. In particular, the present inventors understand that the physical and chemical properties of water will likely vary from one water supply system to the next, and such properties can impact the effectiveness of various types of electromagnetic fields in treating the water. For example, the mineral content, flow rate, temperature and pH of water in a supply system will affect the types and amount of scale and microbes that are likely to form in the water. Thus, the mineral content, flow rate, temperature and pH of water can at least partially dictate the characteristics of electromagnetic fields that will be effective in treating the water. Furthermore, as the mineral content of water varies, the conductivity and capacitance of the water varies. As a result, the resonant frequency of water varies with mineral content, and variations in the resonant frequency in water can at least partially dictate the frequencies of electromagnetic fields that will prove effective in treating the water.

In order to develop a more comprehensive understanding of the optimization of electromagnetic output fields in a variety of different applications, the inventors have developed the experimental closed-loop water supply system 300 shown in FIG. 3. The experimental system 300 simulates a typical real-world, closed-loop water supply system which is susceptible to growing scale and accumulating microbial agents. It is believed that by measuring the characteristics (e.g., mineral content, flow rate, temperature and pH) of water in the system 300 over time, and testing various types of electromagnetic output fields applied to the water as well as various methods of applying electromagnetic output fields to the water, the inventors can improve upon the observations in the prior art to better optimize methods of applying electromagnetic fields in a given water supply system. Water treatment data obtained through testing of the experimental system 300 can be used to develop prescribed user input settings for the device 100 under a variety of water conditions, as well as develop adaptive (automatic) treatment programming for the microcontroller 112 (FIG. 2a).

As shown in FIG. 3, the experimental water supply system 300 includes a hard water reservoir 302 containing a volume of hard, warm water 304 that is circulated throughout the system 300. The system includes a looped, copper pipe 306 beginning at an inlet end 306a in contact with the water 304 in the reservoir 302, and terminating at an outlet end 306g in contact with the water 304 in the reservoir 302. The water 304 is circulated through the pipe 306 by a pump 308 such that the water 304 exits the reservoir 302 into the inlet end 306a and returns to the reservoir 302 from the outlet end 306g.

A cooler 309 is located downstream from the pump 308 and connected to the pump by a pipe section 306b. A coiled pipe section 306c is provided within the cooler 309 to enhance its water cooling performance. An expansion tank 312 is located downstream from the cooler 309 and a check valve 310 is positioned between the cooler 309 and the expansion tank 312. A tankless water heater 316 is positioned downstream from the expansion tank 312 and is connected to the expansion tank 312 by a pipe section 306d. A water treatment device 100 (as described above with respect to FIG. 2a) is connected to the system such that a probe 160, 160b, 260 may be inserted (e.g., into the pipe section 306d via a fitting 314).

A removable fixture or pipe section 320 is provided downstream from the water heater 316 between a pipe section 306e and a coiled pipe section 306f. Stop valves 318 and 322 are provided upstream and downstream, respectively, from the removable fixture 320. Thus, water flow through the pipe fixture 320 can be turned off and the pipe fixture 320 can be removed from the system 300 to enable visual inspection of scale formation within the pipe fixture 320.

A flow meter 324 is located between the coiled pipe section 306f and the outlet end 306g. A TDS/conductivity meter 328 is positioned to measure the TDS levels/conductivity of the water 304 in the reservoir 302. A pH meter 326 is positioned to measure the pH levels of the water 304 in the reservoir 302.

Scale Removal

In order to determine how to operate the device 100 to remove scale that has accumulated in the system 300 and how to operate the device 100 to prevent scale, water conditions conducive to growing scale must first be established. According to an example, it is desirable to have about 1000 parts per million (ppm) of precipitate in the water 304. With the device 100 rendered inoperable/disconnected, the water 304 can be conditioned by first introducing, for example, 900 ppm of calcium carbonate into the water and then measuring the pH of the water 304. If the pH of the water 304 is below 7.8, up to about 100 ppm of sodium bicarbonate can be gradually added to the water 304 until the water has a pH between about 7.8 and about 9. This pH range is conducive to growing scale over time.

Once the desired pH level is obtained, it is believed that the water 304 can be circulated through the system for about 7 to 14 days with the device 100 turned off in order to grow scale (calcium deposits). As water is circulated through the system 300 over the 7 to 14-day period, the pH level, flow rate and TDS level/conductivity of the water 304 can be monitored. If scale is growing in the system, the measured TDS levels and flow rates should decline over time. The pipe fixture 320 can also be removed and visually inspected to determine whether scale is accumulating in the pipe fixture 320.

Once the growth of scale has been confirmed, the device 100 can be operated/energized with various types of electromagnetic output fields and application methods to determine the optimum electromagnetic output fields and application methods for removing the scale in the system 300. If scale is being removed by the device 100, the measured TDS levels and water flow rates should rise over time. The pipe fixture 320 can also be removed and inspected to confirm that any existing scale build-up is being reduced.

The scale removal experiment can be repeated at various water pH levels, flow rates and/or mineral contents in combination with various types of electromagnetic output fields and electromagnetic output field application methods in order to determine optimum scale removal protocols under various water conditions. In addition, various probe designs, materials and placements can be tested to determine optimum probe designs, materials and placements for scale removal.

Removal of microbial agents can also be tested under various water conditions in combination with various types of electromagnetic output fields, electromagnetic output field application methods and/or probe designs, materials and placements.

Scale Prevention

Once conditions for growing scale have been established as described above, the system 300 can be initialized under similar scale growth-promoting conditions with the device 100 energized and no scale present at the time of system initialization. The system can be run for 7 to 14 days. If the device is successfully preventing the growth of scale, then the water TDS levels and flow rates measured over the 7 to 14-day period should remain essentially constant, or should decline at a slower rate than they did in the initial 7 to 14-day scale growth period in the scale removal experiment described above.

The scale prevention experiment can be repeated at various water pH levels, flow rates and/or mineral contents in combination with various types of electromagnetic output fields and application methods in order to determine optimum scale prevention protocols under various water conditions. In addition, various probe designs, materials and placements can be tested to determine optimum probe designs, materials and placements for preventing scale growth.

Prevention of microbial agent growth can also be tested under various water conditions in combination with various types of electromagnetic output fields, electromagnetic output field application methods and/or probe designs, materials and placements.

It should be apparent that the foregoing describes only selected embodiments of the invention, and numerous changes and modifications may be made to the embodiments disclosed herein by one of ordinary skill in the art without departing from the general spirit and scope of the invention. For example, though water has been the liquid utilized in the description herein, other suitable liquids may be used. For example, those liquids used in the heating and/or cooling systems of buildings.

What is claimed is:

1. A system for removing scale or preventing growth of scale comprising: a main unit comprising a generator configured to generate an output signal at a resonant frequency; and an immersible, capacitive device comprising a positive conductive element, and a negative conductive element, where the positive conductive element is smaller than the negative conductive element and is at least 0.75 the size of the negative conductive element, the capacitive device configured to generate an electromagnetic output field at the resonant frequency based on the output signal from the main unit and to reduce fringing effects, said main unit further operable to control the electromagnetic output field to at least remove scale or prevent growth of scale in a liquid.

2. The system as in claim 1, further comprising a digital control section configured to receive inputs comprising desired characteristics of the electromagnetic output field.

3. The system as in claim 1, wherein said positive conductive element or said negative conductive element is configured to vary a distance between the positive conductive element and the negative conductive element.

4. The system as in dam 1, further comprising a sensor configured to measure at least one of a total dissolved solids, conductivity, flow rate, temperature, and pH.

5. The system as in claim 4, wherein said main unit is configured to adaptively alter the resonant frequency of the output signal based on measurements from said sensor of the at least one of a total dissolved solids level, conductivity, flow rate, temperature, and pH.

6. The system as in claim 1, wherein the positive conductive element comprises a first plate, and the negative conductive element comprises a second plate, wherein a surface area of the first plate is 0.75 to 0.90 the surface area of the second plate.

7. The system as in claim 1, wherein the positive conductive element comprises a first cylindrical structure, and the negative conductive element comprises a second cylindrical structure, wherein a length of the first cylindrical structure is 0.75 to 0.90 the length of the second cylindrical structure.

8. The system as in claim 7, wherein said positive conductive element and negative conductive element are configured to horizontally align.

9. The system as in claim 7, wherein said positive conductive element comprises a tube and said negative conductive element comprises a rod aligned inside said tube having an annular spacing between the positive conductive element and the negative conductive element.

10. The system as in claim 1, wherein said immersible, capacitive device comprises a cylindrical housing.

11. The system as in claim 1, further comprising a user interface configured to exchange signals with the main unit to control the characteristics of electromagnetic output field.

12. A method for removing scale or preventing growth of scale comprising:
immersing an immersible, capacitive device in a liquid, said device comprising a positive conductive element, and a negative conductive element configured to reduce fringing effects, where the positive conductive element is smaller than the negative conductive element and is at least 0.75 the size of the negative conductive element;
outputting an output signal from a main unit to the immersible, capacitive device;
generating an electromagnetic output field based on the output signal; and
controlling the generation of the electromagnetic output field to at least remove scale or prevent growth of scale in the liquid.

13. The method according to claim 12, further comprising adjusting a distance between the negative conductive element and the positive conductive element.

14. The method according to claim 12, further comprising generating a digital driver signal or an analog driver signal.

15. The method according to claim 12, further comprising:
inputting desired characteristics of the electromagnetic output field into an input system of a digital control section, and
operating a digital waveform generator to generate a digital driver signal based on the desired characteristics.

16. The method according to claim 15, further comprising selecting at least one of the digital driver signal or the analog driver signal to drive an output amplifier to generate the output signal.

17. The method according to claim 16, further comprising controlling the selection of at least one of the digital driver signal or the analog driver signal using a digital/analog selector.

18. The method according to claim 17, further comprising automatically switching to the analog signal to feed the digital/analog selector upon failure of a digital control system.

19. The method according to claim 12, further comprising:
measuring at least one of total dissolved solids, conductivity, flow rate, temperature, and pH of a liquid; and
adaptively altering the output signal based on said measurements.

20. The method as in claim 12, further comprising exchanging signals with the main unit to remove scale or prevent growth of scale in a liquid using a user interface selected from the group consisting as in a desktop computer, laptop computer, tablet computer, handheld device, and electronic monitoring device.

21. A method for removing scale or preventing the growth of scale comprising:
powering a main unit, configured to generate an output signal and control an electromagnetic output field generated based on the output signal, to at least remove scale or prevent growth of scale in a liquid, and an immersible, capacitive device comprising a positive conductive element and a negative conductive element configured to reduce fringing effects and to generate the electromagnetic output field based on the output signal, where the positive conductive element is smaller than the negative conductive element and is at least 0.75 the size of the negative conductive element.

* * * * *